March 26, 1968          F. L. HATKE          3,374,787
INTRA-UTERINE CONTRACEPTIVE DEVICE
Filed Nov. 18, 1965
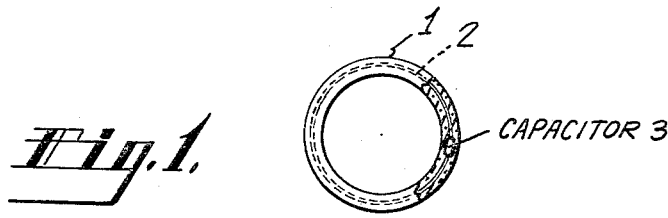
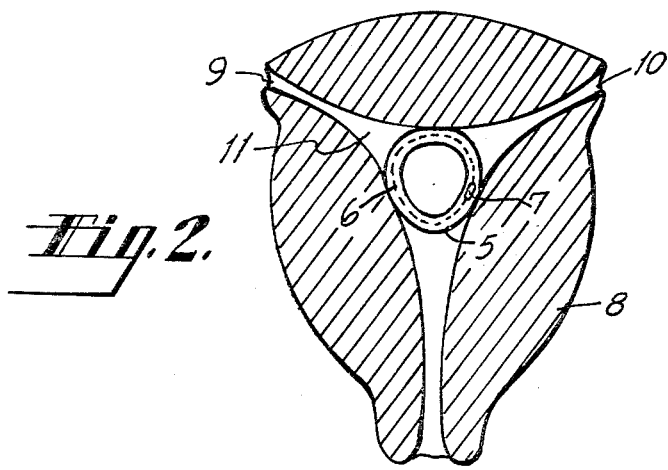
INVENTOR.
FRED L. HATKE

United States Patent Office 3,374,787
Patented Mar. 26, 1968

3,374,787
INTRA-UTERINE CONTRACEPTIVE DEVICE
Fred L. Hatke, Skillman, N.J., assignor to Radio Corporation of America, a corporation of Delaware
Filed Nov. 18, 1965, Ser. No. 508,456
6 Claims. (Cl. 128—130)

This invention relates to contraceptive, intra-uterine birth control devices and more particularly to an improved contraceptive, intra-uterine device whose presence and proper position in the uterus can be readily determined.

Birth control or contraception has been practiced by innumerable methods to various degrees of effectiveness for centuries and in modern times has become the subject of organized study and even actively encouraged by certain governments in the world. Graefenberg in 1929 reported a ring device which is known by his name and which became the subject of dispute among gynecologists all over the world. This ring is about one inch in diameter, flexible and formed of silver originally and subsequently of other metals that are presumably inert. Since then various improvements have been made such as the use of nylon, plastic or silkworm gut. Reports have shown that, when inert material are used, these device can be effective and appear to be safe. However, their effectiveness is lost when they have been passed out of the uterus or are in an improper position. Therefore, for effective use, these devices must be checked periodically to determine if they are present and, if present, whether they are in their proper place. A physician usually determines this by probing in the uterus to determine if the device is present and if the device is in its proper position for maximum effectiveness. Such an examination is often a painful and difficult undertaking due to the sensitive area in which the physician is working. It is not recommended that X-rays be used to determine the placement of these devices because of the ill effects X-rays may have on such areas.

Therefore, it is an object of this invention to provide a novel intra-uterine contraceptive device, the presence and position of which can be easily and immediately determined by a remote monitoring device.

Briefly, an intra-uterine device is constructed as a resonant circuit having a measurable resonant frequency and comprised of inductance and capacitance. The device is designed so that, when it is properly placed in the uterine cavity, the resonant circuit provided by the device has a predetermined resonant frequency. If the device is improperly placed, the resonant frequency is different from the predetermined frequency so that this condition can be readily detected. The inability to obtain a measurable resonant frequency from the device indicates the absence of the device from the uterus.

The invention will now be described in greater detail in connection with the accompanying drawing in which:

FIG. 1 is a diagrammatic illustration of one embodiment of a contraceptive divice according to this invention, and FIG. 2 is an illustration of the frontal section through the uterus showing one embodiment of the intra-uterine contraceptive device of FIG. 1 placed in the uterine cavity.

FIG. 1 illustrates a round, tubular, plastic ring 1 which is, for example, approximately ¾ inch in diameter. The plastic ring 1 has the property of being smooth, flexible and resilient. A closed wire ring 2, for example, of copper, silver, or other good conductor is placed inside the tubular plastic ring 1. The wire ring 2, which may be stranded or solid wire, placed inside the tubular plastic ring 1 is also about ¾ inch in diameter and must also be flexible and resilient. The size of the wire used to form the wire ring 2 whether stranded or solid is determined to provide the desired degree of flexibility while at the same time providing the necessary energy storage in the resonant circuit of which it forms a part. Also, while a single turn is shown for the wire ring 2, two or more turns may be used. A small capacitor 3 is placed within the tubular plastic ring 1 and is connected at its terminals to wire ring 2 to form with the inductancec of the ring 2 a resonant circuit. The capacitor 3 may be of a type available commercially and has a value in the order of 68 μμf, for example. A capacitor of this value can be made extremely small and look like a small bump on the plastic ring 1. With the wire ring and plastic ring fully extended as shown in FIG. 1, the wire ring 2 and capacitor 3 of the value described can be made to resonate about a certain frequency, for example, 80 megacycles (mc.). With the plastic ring 1 squeezed, the wire ring 2 and capacitor 3 will resonate about a second frequency different from the first, for example, 85 mc. The value of the capacitor 3 and the construction of the wire ring 2 are interdependent and are chosen so that the combined capacitance and inductance provided thereby form a resonant circuit having the proper energy storage characteristics for the given application while also allowing the physical flexibility and resiliency needed.

FIG. 2 illustrates a frontal section through the uterus showing the tubular plastic ring 5 with inner wire ring 6 and capacitor 7 placed in the uterine cavity. As is the usual practice for such devices, the primary plane of the ring 5 lies within the frontal plane of the uterus. Notice that the tubular plastic ring 5 and inner wire ring 6 are slightly compressed by the walls of the uterus 8 and may be in contact with the openings of the oviducts 9 and 10 located at the upper left and right positions, respectively, of the uterus 8. Because of the resiliency of the wire ring 6 and tubular plastic ring 5, the rings adapt themselves in position to conform to the shape and dimensions of the uterine cavity 11. When the patient is fitted with the plastic ring 5 and it is optimally placed in the uterus, a measurement of the resonant frequency of the plastic ring assembly is taken by a remotely located frequency measuring device. The measured frequency is determined by the conformance of the plastic ring assembly to the shape of the uterus. At later periods, additional frequency measurements using a remotely located frequency detecting device are made to determine if the device is still there and, if so, if it has changed position. Any change in the resonant frequency from the previously measured frequency to a higher frequency indicates that the ring assembly has been squeezed by a change in position resulting in a change in the value of inductance and that the contraceptive device is not in the optimum position. If no measurable frequency is detected, the device has been passed out of the uterus.

The device used to measure remotely the frequency of the resonant circuit provided by the wire ring and capacitor may be a simplified version of the monitoring devices used for the detection of the "radio pills". One such device makes use of the energy absorption technique which occurs when the resonant frequency of a detection oscillator is equal to the instantaneous resonant frequency of the resonant circuit. A suitable approach to detecting the instantaneous resonant frequency of a remote transducer has been described by W. J. Bieganski, U.S. Patent No. 3,051,896, filed May 6, 1958. Any other suitable method, for example, grid dip, for detecting the frequency of a resonant circuit external to the detecting apparatus may be employed.

It will be understood that the above description of the present invention is susceptible to various modifications, changes and adaptations, and the same are intended to be comprehended within the meaning and range of equivalents of the appended claims.

What is claimed is:
1. A contraceptive intra-uterine device comprising:
a flexible, resilient, electrically conductive member adapted to be placed with its primary plane in the frontal plane of a uterus with the actual shape of said member conforming to the internal shape and dimensions of said uterus, said member having a value of inductance when in said uterus determined by the shape assumed by said member, and
a capacitance means connected to said member to form with the inductance of said member a resonant circuit having a resonant frequency determined by the shape of said member and therefore the position of said member in said uterus.

2. A contraceptive intra-uterine device as claimed in claim 1, and wherein
said member is formed as a single tabular ring.

3. A contraceptive intra-uterine device comprising:
a member adapted to be placed with its primary plane in the frontal plane of a uterus with the actual shape of said member conforming to the shape and dimensions of said uterus at the position of said member in said uterus,
inductance means internal of said member and having a value of inductance determined by the shape of said member when in said uterus, and
capacitance means internal of said member and connected to said inductance means to form with said inductance means a resonant circuit having a measurable resonant frequency determined by the shape of said member and therefore the physical position of said member when in said uterus.

4. A contraceptive intra-uterine device as claimed in claim 3 and wherein:
said member is a smooth, flexible, resilient, tubular plastic ring.

5. A contraceptive intra-uterine device as claimed in claim 3 and wherein:
said inductance means is an electrically conductive ring of wire positioned internally of said member to exhibit a value of inductance determined by the shape of said member when in said uterus.

6. A contraceptive intra-uterine device comprising:
a smooth, flexible, resilient, tubular ring-like member adapted to be placed with its primary plane in the frontal plane of a uterus with the actual shape of said member conforming to the internal shape and dimensions of said uterus at the position of said member in said uterus,
a metallic electrically conductive wire ring internal to said member and conforming in shape to that of said member, said wire ring having a value of inductance determined by the shape thereof and therefore of the shape of said member when in said uterus, and
a capacitor internal to said member and connected to said wire ring to form with the inductance of said wire ring a resonant circuit having a resonant frequency determined by the value of said inductance and therefor the position of said member in said uterus.

References Cited

UNITED STATES PATENTS 3,051,896   8/1962   Bieganski _____ 324—71

ADELE M. EAGER, *Primary Examiner.*